United States Patent
Okazaki

(10) Patent No.: US 6,953,816 B2
(45) Date of Patent: Oct. 11, 2005

(54) EMULSION COMPOSITION FOR FILM FORMATION, A FILM PREPARED THEREFROM, A METHOD FOR PRODUCING THE SAME, AND A SURFACE TREATING METHOD USING THE SAME

(75) Inventor: Chizuko Okazaki, Hokkaido (JP)

(73) Assignee: National Institute of Advanced Industrial Science and Technology (JP)

( * ) Notice: Subject to any disclaimer, the term of this patent is extended or adjusted under 35 U.S.C. 154(b) by 31 days.

(21) Appl. No.: 10/111,312

(22) PCT Filed: Aug. 22, 2001

(86) PCT No.: PCT/JP01/07187

§ 371 (c)(1),
(2), (4) Date: Apr. 23, 2002

(87) PCT Pub. No.: WO02/24801

PCT Pub. Date: Mar. 28, 2002

(65) Prior Publication Data

US 2002/0183406 A1 Dec. 5, 2002

(30) Foreign Application Priority Data

Aug. 23, 2000 (JP) ......................................... 2000-251807
Aug. 16, 2001 (JP) ......................................... 2001-284127

(51) Int. Cl.[7] .............................. C08J 3/07; C08L 5/00; C08L 3/00; C08F 18/08; B44C 1/165

(52) U.S. Cl. ........................... 524/27; 524/56; 156/230; 427/146; 428/195.1; 428/914; 525/330.3

(58) Field of Search ............................... 156/230, 231, 156/235, 236, 240, 247, 277, 289; 427/146, 147, 148, 149; 428/200, 201, 343, 347, 352, 355 R, 355 CP, 914, 195.1, 195; 525/56, 330.3; 524/27, 47, 56, 503

(56) References Cited

U.S. PATENT DOCUMENTS 3,438,915 A * 4/1969 Girard .......................... 524/27
3,554,767 A * 1/1971 Daum ............................ 426/6
3,616,005 A 10/1971 Wetstone
4,089,723 A * 5/1978 Williams ..................... 156/246

FOREIGN PATENT DOCUMENTS

| GB | 870287 | | 6/1961 | |
|---|---|---|---|---|
| GB | 1176667 | * | 1/1970 | ............. C08F/3/54 |
| GB | 2179953 | * | 3/1987 | ............. C09J/3/00 |
| JP | 50-20481 | | 7/1975 | |
| JP | 53-021229 | | 2/1978 | |
| JP | 63-132981 | | 6/1988 | |
| JP | 04-001353 | | 1/1992 | |
| JP | 2001-12049 | | 1/2001 | |
| JP | 2001-151602 | | 6/2001 | |

OTHER PUBLICATIONS

FAUXSTORE, "Crackle Kit $ 19.95", http://www.fauxstore.com/web_specials_start.asp, dated Feb. 4, 2001.*

European Search Report for corresponding European Patent Application No. 01958402.8, Feb. 26, 2004.

* cited by examiner

Primary Examiner—Jerry Lorengo
(74) Attorney, Agent, or Firm—Finnegan, Henderson, Farabow, Garrett & Dunner LLP

(57) ABSTRACT

The present invention provides a polymer composition for film formation which provides a film having sufficient elongation and strength even on the surface of the film with sharp irregularities by rewetting with water after coating and drying. The polymer composition for film formation contains at least one component selected from the group consisting of an emulsion comprising a homopolymer of polyvinyl acetate or a copolymer of polyvinyl acetate with a monomer selected from acrylic ester, acrylic amide, acrylic acid, methacrylic acid, methacrylic ester, maleic acid, maleic anhydride, and fumaric acid, and an aqueous solution of sap, fruit liquid, honey, and saccharide.

53 Claims, No Drawings

EMULSION COMPOSITION FOR FILM FORMATION, A FILM PREPARED THEREFROM, A METHOD FOR PRODUCING THE SAME, AND A SURFACE TREATING METHOD USING THE SAME

TECHNICAL FIELD

The present invention relates to a polymer composition for film formation, a method for producing the same, methods for utilizing the same including a surface treating method of cracks and the like, an article utilizing the polymer composition, a transfer liquid comprising the polymer composition, and a transfer film utilizing the transfer liquid. The polymer composition for film formation and the transfer liquid provided by the present invention, at the time of transference after being applied (coating, dispersion, immersion) onto a substrate (a supporting substrate such as paper) for supporting an object to be transferred (e.g., color image or monochrome image) and dried, form a durable elongating film particularly when wetted with water. More particularly, the present invention relates to a composition which is suitable for being transferred onto, when an object to be transferred is on a substance (support) having a complex surface configuration, or when a substrate to be transferred has a complex surface configuration, that is, a thick curved surface or a surface of a complex irregular product to which the application was impossible in conventional decoupage, a transfer liquid comprising the composition, a transfer film utilizing the transfer liquid, a transfer method and a surface treating method of cracks and the like, and an article utilizing the polymer composition.

BACKGROUND ART

In decoupage and the like, an emulsion composition of vinyl acetate, which is described in for example, U.S. Pat. No. 3,616,005, has been heretofore known as a finishing composition for covering a surface of a product. This emulsion composition, however, is used as a decoupage finishing agent and merely as an adhesive for prints. Transfer Coat (tradename: manufactured by Gentie, Inc., transfer liquid) etc. is a so-called "decoupage transfer liquid" for transferring and applying pictures or drawings onto a substrate having a substantially flat surface configuration. This has drawbacks such that, even rewetted with water after coating and drying, elongation is insufficient and a film, which is sufficiently suitable for a substrate, could not be formed. Conventionally, printing paper, transfer paper or the like, which is covered with a film, exists, but a film separated from paper is hard and, thus, elongation was insufficient. Therefore, images were cracked and a complex surface could not be covered.

Regarding conventional transfer methods, the general procedure thereof and problems involved therein are described below.

(1) A transfer liquid is coated on paper having images printed thereon (e.g., general photographs and color copied images) 8 to 10 times. In this case, bubbles are likely to be generated even at the time of coating at room temperature.

(2) A transfer liquid is dried. Time required for air drying per coating is about 30 to 40 minutes. In this case, a conventional liquid cannot be warm-air dried because air bubbles are likely to be generated when warm-air dried with a hair dryer.

(3) Coated paper was allowed to stand overnight after coating. Because of a fear of cracks on an image-printed paper, which is incorporated into one with a coated layer prepared by coating of a transfer liquid upon immersion in water, the paper is immersed in warm water for about 15 minutes. In this case, a neutral detergent may be added in order to facilitate the separation of paper. The surface will be roughened if immersed for a long period of time and, thus, the paper should be immersed in water no longer than 40 minutes.

(4) Subsequently, paper, which was softened through immersion in water, was scrubbed over a long period of time and a residual image and a film (transfer film) for supporting therefor are collected. In this case, time and techniques are required in scrubbing of paper. A transfer film is sometimes damaged and the resulting image lacks clearness.

(5) A transfer film is applied onto a substrate to which the transfer film is transferred (transfer substrate). A film prepared from a conventional liquid can be applied onto a curved surface having a flat adhering surface. When there are irregularities on the transfer substrate, the whole substrate cannot be covered with a single sheet of film due to insufficient elongation of the film. Thus, the substrate can be only covered segment by segment and the film can only cope with a height of 3 mm to 4 mm. When forcibly applied, a film prepared from a conventional liquid is not likely to be reduced to the original size if excessively elongated. The film prepared from a conventional liquid is likely to be hardened and cracked and, thus, is not adequate to the dry storage as a transfer film.

The object of the present invention is to eliminate drawbacks of a conventional transfer liquid or transfer method and to provide a polymer composition for film formation providing a film having good elongation sufficiently coping with a surface of a substrate having sharp irregularities thereon and a transfer liquid containing the composition through the application of a polymer composition for film formation onto a substrate supporting by an object to be transferred, drying, and then rewetting with water.

The other object of the present invention is to provide a transfer method using the polymer composition for film formation and an article prepared by the transfer method.

The further object of the present invention is to provide a decorating method using the polymer composition for film formation and an article prepared by the decorating method.

DISCLOSURE OF THE INVENTION

The present invention provides a polymer composition for film formation containing following components (1) and (2):

(1) (i) a polymer component containing a homopolymer of vinyl acetate or a partial hydrolyzate thereof or (ii) a copolymer of vinyl acetate with at least one monomer selected from the group consisting of acrylic ester, acrylic amide, acrylic acid, methacrylic acid, methacrylic ester, maleic acid, maleic anhydride, and fumaric acid, or a partial hydrolyzate thereof; and (2) a component containing at least one member selected from the group consisting of the following component, (a) sap,
(b) fruit liquid,
(c) honey, and
(d) saccharides.

The present invention provides the polymer composition for film formation wherein sap component (a) contains at least one member obtained from pine, white birch, maple, sugar cane, and sugar beet.

The present invention provides the polymer composition for film formation wherein fruit liquid component (b) contains at least one member obtained from grapes, peaches, citrus fruits, apples, bananas, watermelons, melons, cherries, pears, pineapples, palms, papayas, mangos, and durians.

The present invention provides the composition for film formation wherein honey component (c) contains at least one member obtained from milk vetches, horse chestnuts, and acacias.

The present invention provides the composition for film formation wherein saccharide component (d) contains at least one member selected from the group consisting of xylitol, sucrose, fructose, glucose, chitosan, chitin, mannan, and guar gum.

The present invention provides each of the compositions for film formation wherein a polymer component as component (1) is in an emulsion form.

The present invention provides each of the compositions for film formation wherein a polymer composition for film formation is in an emulsion form.

The present invention provides each of the polymer compositions for film formation which further contains at least one member selected from the group consisting of a plasticizer, a storage stabilizer, a filler, a dyestuff, a pigment, a flavor, a light-resisting agent, and an oxidation stabilizer.

The present invention provides the polymer composition for film formation, which contains 3 to 30% by weight of a plasticizer based on an emulsion as component (1).

The present invention provides the polymer composition for film formation which contains 5 to 50 parts by volume of an aqueous solution as component (2) based on 100 parts by volume of an emulsion as component (1).

The present invention provides the polymer composition for film formation wherein a total water content is 55 to 95% by weight in a polymer composition for film formation.

The present invention provides a polymer composition for decoupage film formation, which utilizes any one of the polymer compositions for film formation.

The present invention provides a transfer liquid, which utilizes any one of the polymer compositions for film formation.

The present invention provides a transfer film comprising a film prepared from the transfer liquid and an object transferred onto the film, which is provided by applying the transfer liquid onto the object to be transferred and semi-drying, or performing a step of drying at least once.

The present invention provides the transfer film, wherein the object to be transferred is selected from the group consisting of the hue, patterns, symbols, figures, letters, maps, draftings, wiring diagrams of a surface of a substrate for supporting the object to be transferred, or three-dimensional configurations thereof, or a combination of two or more thereof.

The present invention provides each of the transfer films, wherein a substrate for supporting an object to be transferred has a three-dimensional or plane configuration and the resultant transfer film maintains its three-dimensional or plane configuration.

The present invention provides each of the transfer films, which has cracks, irregularities, or a combination thereof.

The present invention provides each of the transfer films, which has an ability of shape-memory.

The present invention provides a transfer method wherein each of the transfer films is applied onto a transfer substrate and integrated with the substrate.

The present invention provides a transfer method wherein each of the transfer films is applied onto a transfer substrate, even a margin portion besides the object image, non-image or optional image is integrated with a transfer film and the whole area is transferred all at once without cutting and pasting.

The present invention provides a transfer method wherein, in the application of the transfer film onto a transfer substrate, an adhesive is interposed between the transfer substrate and the transfer film, thereby transferring an object to be transferred onto the substrate.

The present invention provides a transferred product comprising an object to be transferred and a transfer substrate which is produced by any of the above methods.

The present invention provides a polymer composition for cracked film formation containing at least one member of component (1) of the polymer composition for film formation according to the present invention or at least one member of component (1) and at least one member of component (2) of the polymer composition.

The present invention provides a method for forming a cracked film through the application of the polymer composition for cracked film formation onto a surface of a supporting substrate.

The present invention provides a method for forming a cracked film by applying the polymer composition for cracked film formation onto a substrate to form a film and covering the surface of the film with a substance different from a component for the film, and generating cracks integrally to the substrate and the film.

The present invention provides a method for forming a decorative cracked film wherein a substance different from a component for film formation is added in a cracked portion formed by each of the above methods.

The present invention provides a cracked film, which is obtained by removing the film produced by any of the above methods for forming a cracked film from a supporting substrate.

The present invention provides an article having a cracked film prepared by integrating the film produced by any of the above methods with a supporting substrate.

The present invention provides each of the transfer methods wherein any of the above methods is applied to an image transfer film before or after the application onto the substrate.

The present invention provides a method for forming a cracked film wherein the polymer composition for cracked film formation is applied onto an object to be transferred selected from the group consisting of the hue, patterns, symbols, figures, letters, maps, draftings, wiring diagrams, or three-dimensional configurations thereof or a combination of two or more thereof and forms a film, thereby generating cracks.

The present invention provides the method for forming a cracked film wherein a film is formed by applying onto an object to be transferred selected from the group consisting of the hue, patterns, symbols, figures, letters, maps, draftings, wiring diagrams of the surface of the substrate supporting the object to be transferred, or three-dimensional configuration thereof or a combination of two or more thereof and cracks are generated along the lines constituting the covered object to be transferred.

The present invention provides the method for forming a cracked film, wherein a crack pattern having no association with the object to be transferred is unintentionally formed.

The present invention provides a method for forming a decorative cracked film wherein at least one powder or liquid selected from the group consisting of a metal, a dyestuff, a pigment, and another organic or inorganic substance is rubbed into various cracked portions prepared from the polymer composition for cracked film formation.

The present invention provides a transfer method for applying these cracked films or a film having powders rubbed in the cracks onto a substrate as an image transfer film.

The present invention provides an article containing a film produced by any of the above methods.

BEST MODE FOR CARRYING OUT THE INVENTION

The embodiments of the present invention are described with a central focus on a polymer composition for film formation.

The present invention provides a polymer composition for film formation containing following components (1) and (2):

(1) (i) a polymer component containing a homopolymer of vinyl acetate or a partial saponification product thereof or (ii) a copolymer of vinyl acetate with at least one monomer selected from the group consisting of acrylic ester, acrylic amide, acrylic acid, methacrylic acid, methacrylic ester, maleic acid, maleic anhydride, and fumaric acid or a partial hydrolyzate thereof; and (2) a component containing at least one member selected from the group consisting of the following components, (a) sap,
(b) fruit liquid,
(c) honey, and
(d) saccharides.

The present invention has been made based on a novel finding by the present inventor, that is, a elongating durable film, particularly, a film having a transferability, is provided by coating a polymer composition for film formation having the above formulation on an object to be transferred and drying, followed by rewetting with water.

The emulsion containing a homopolymer or copolymer of vinyl acetate used herein can be obtained as a commercial product. For example, the following group of products, which are sold at, for example, handicrafts shops, can be employed. Exemplified are "Woodworking Bond (manufactured by Konishi Co., Ltd., adhesive)," "Mod Podge (manufactured by PLAID, finishing agent)," "POREA (manufactured by PLAID, finishing agent)," "Shine Finish (manufactured by Gentie, Inc., finishing agent)," "Hal Gloss (manufactured by HAL ENTERPRISES, finishing agent)," "Clear Podge (manufactured by American Handycraft, finishing agent)," "Topcoat Gloss (manufactured by Gentie, Inc., finishing agent)," "Transfer Coat (tradename: manufactured by Gentie, Inc., transfer liquid)," "Hal Transfer (manufactured by HAL ENTERPRISES, transfer liquid)," and "San Finish (manufactured by SANYU, finishing agent)."

A homopolymer of vinyl acetate used herein can be easily obtained by adequately selecting the following emulsifiers, polymerization initiators, catalysts, protection stabilizers, plasticizers, and various additives and mixing with a monomer of vinyl acetate, thereby conducting emulsion polymerization of the monomer of vinyl acetate in a conventional method.

A copolymer of vinyl acetate can be easily obtained by mixing a monomer of vinyl acetate with a monomer (comonomer) to be copolymerized therewith, adequately selecting the following emulsifiers, polymerization initiators, catalysts, protection stabilizers, plasticizers, and various additives and mixing with the monomers, thereby conducting emulsion polymerization in a conventional method. In this case, comonomers usable herein include at least one monomer selected from the group consisting of acrylic ester, acrylic amide, acrylic acid, methacrylic acid, methacrylic ester, maleic acid, maleic anhydride, and fumaric acid. From the viewpoints of transferability, film-forming properties, film strength, extensibility (ease of extension), compatibility with a shape (ease of adhesion to an irregular shape), anti-cracking properties, and clarity of the resulting film, preferred comonomers include at least one monomer selected from the group consisting of acrylic ester, acrylic amide, acrylic acid, methacrylic acid, methacrylic ester, maleic acid, maleic anhydride, and fumaric acid. More preferred comonomers include at least one monomer selected from the group consisting of acrylic ester, acrylic amide, acrylic acid, methacrylic acid, methacrylic ester, maleic acid, and maleic anhydride. Particularly preferred comonomers include at least one monomer selected from the group consisting of acrylic ester, acrylic amide, acrylic acid, methacrylic acid, and methacrylic ester.

General-purpose products such as phthalic ester including dibutyl phthalate are preferably used as a plasticizer. In the present invention, the amount of a plasticizer added is specified as 3 to 30% by weight based on the emulsion. When the amount is 3% or less than 3% by weight, a film is hardened while the film becomes sticky when the amount exceeds 30% by weight. In the present invention, the amount of sap added is specified as 5 to 50% by volume based on 100% by volume of the emulsion. When the amount of the sap is 5% by volume, elongation of the film is diminished while the durability of the film is lost by propagation of bacteria and the like when the amount exceeds 50% by volume. Regarding a total water content in the present invention, a total water content in the composition is specified as 55 to 95% by weight. When the water content is 5% or less than 55% by weight, an elongating film cannot be obtained while the film becomes fragile when the content is more than 95% by weight.

Specific formulation of the polymer composition for film formation according to the present invention is exemplified in Table 1. The procedure for carrying out the method for transferring a color copied photograph of lavender flower using the composition as a transfer liquid is described.

The procedures of a method for producing and a method for transferring an image-transfer film using the transfer liquid of the present invention is described together with differences in functions and effects from the case when a conventional transfer liquid is used (a formulation is exemplified as a comparative example in the table).

(a) The transfer liquid shown in Table 1 is coated 4 to 5 times on a color copy of a colored photograph of lavender (in this case, a color copy of an image of bluish purple lavender flower is an object to be transferred and its support is paper). The transfer liquid of the invention of the present application is free from bubble unlike the conventional liquid and is smooth. Thus, it is easy to coat. Further, time required in air drying per coating is as short as about 20 minutes. It takes only about half the conventional time per coating (about one hour and a half, 5 times in total). A conventional transfer liquid requires 8 to 10 times of coating (about 5 hours, 10 times in total).

(b) Drying during coating can be warm-air dried using a hair dryer and it requires only several minutes (about 30 minutes, 5 times in total) per coating. It can be also air dried at room temperature. When a conventional transfer liquid is used, drying time per coating and the number of times of coating are respectively twice as the present invention and bubbles are likely to be generated at the time of coating. When the transfer liquid of the present invention is used, bubbles are not generated and warm-air drying can be carried out as described above. The conventional liquid, however, generates bubbles and, thus, warm-air drying cannot be performed. When the transfer liquid of the present invention is used, it can proceed to the next step and the film can be immersed for a long period of time upon immersion in water for about 5 minutes immediately after coating. In contrast, when the conventional liquid is used, because of a fear of cracking upon immersion in water after being allowed to stand overnight after coating, the formed film should be immersed in warm water for about 15 minutes. Further, addition of a neutral detergent is recommended in order to facilitate the separation of paper. In this case, since the surface is roughened if immersed for a long period of time, there are various restrictions such that paper should be immersed no longer than 40 minutes.

(c) Subsequently, paper, which is softened through immersion in water, is scrubbed to obtain the residual image of bluish purple lavender (object to be transferred) and a film for supporting the same (e.g., a copolymer of vinyl acetate-methacrylic ester), that is, the transfer film of the present invention.

(d) This transfer film is applied onto a substrate to be transferred (an engraved wood block having irregularities formed thereon in order to exhibit the three-dimensional impression of flower). The film prepared from the liquid of the present invention, without cracking of image, is an elongatable film, which is capable of coping with complex irregularities. Even though there are complex irregularities, the whole substrate can be covered with a sheet of film. For example, regardless of the size of the bottom surface, an image on a film is not cracked even though the film is elongated to a substantially domed state. Regardless of the length an image on a film is not cracked even though the film is elongated to about 1.5 times in a planer direction. In application of the transfer film, an adhesive can be properly used. On the other hand, the film prepared from the conventional liquid can be applied onto a curved surface with a flat adhering surface. When there are irregularities, the substrate can be covered only section by section due to insufficient elongation of the film and it can cope with only a height of 3 to 4 mm.

The film prepared from the liquid of the present invention can be easily reduced to the original size through removal followed by immersion in water prior to adhesion even if excessively elongated at the time of application (having an ability of shape-memory). For example, regardless of the size of the bottom surface, the film can be returned to the original size even though the film is elongated to a substantially domed state. Regardless of the length, the film can be reduced to the original size even if elongated to about 1.5 times in a planer direction. Further, even though the film is allowed to stand for a long period of time after adhesion, it can be reduced to the original likewise if the time immersed in water is prolonged. For example, regarding those elapsed approximately one month after adhesion, the film can be removed from the substrate after immersion in warm water overnight and the original shape is regained. In contrast, the film prepared from the conventional liquid is less likely to be reduced to the original size if excessively elongated.

Further, the film prepared from the liquid of the present invention is soft even in a completely dried state. Thus, the film can be stored for a long period of time by sandwiching between coated papers and the like. The film prepared from the conventional liquid, however, is hardened and not adequate to the dry storage because of a fear of cracking.

Transfer films supporting a plurality of images are prepared and successively applied (superimposed) onto a transfer substrate. Images can be put on top of each other to provide decoration by making use of the superposition effect.

Examples of a method for forming a cracked film and a surface treating method (a method for decorating cracks) using the polymer composition for film formation of the present invention are described in comparison with conventional method.

In the present invention, the transfer liquid composed of the polymer composition for film formation of the present invention is coated on a substrate supported by an object to be transferred 3 to 4 times, a commercially available other treating liquid, equivalent to component (1) of the polymer composition of the present invention, is then coated, and the film can be air dried in about 20 minutes. Thus, a cracked film supporting an object to be transferred having good elongation can be obtained. In this method, when a film having cracks is merely provided without aiming the transfer of an object to be transferred, a coat (film) having only cracks can be obtained by carrying out the above procedures on a simple substrate without any image to be transferred.

On the contrary, according to a conventional method, a commercially available transfer liquid is coated 5 to 6 times and a commercially available cracking agent is coated likewise to a thickness of about 2 mm, air dried and allowed to stand for 2 to 3 days. Thereafter, the surface is wetted and a cracking agent is removed using water-resistant paper and the like, thereby obtaining a cracked film.

As is apparent from the foregoing, the conventional method for producing a cracked film required complicated procedures and materials and time. In contrast, the method of the present invention can provide a cracked film with a good transferability and elongation by a simple procedure in a short time.

The cracked film obtained in the present invention (can be either in a non-dried or dried state) was covered with a substance different from a component of a film (solid substances including organic or inorganic powders and fine particles such as a gold foil, a gold dust, a pigment, a dyestuff, pearlite, and vermiculite or liquid substances such as other coating materials are included herein) and substances different from a component of a film were added in the cracked portion to incorporate into one. Thus, a pattern, which follows the shape of the cracks, can be formed.

In the method for forming a cracked film according to the present invention, coating by other substances can be carried out after coating of the transfer liquid of the present invention and before drying, thereby forming cracks concurrently with drying.

These methods can be utilized in, for example, decorations such as gold foil decoration on the surface of a lacquer ware or paintings on the surface of a pottery.

In the formation of the transfer film and the formation of the cracked film described above, these procedures are repeated more than once to realize a transference of a more complicated pattern, formation of cracked patterns or the like.

A transparent or translucent film may be provided on the surface of a transfer film or a cracked film. Alternatively, at the finishing stage in the transfer method, the method for forming a cracked film, or a decorating method utilizing these methods, a transparent or translucent film may be provided or another protecting film or decorating film may be provided in combination.

These transfer methods can be utilized in the production of scientific samples. As a concrete example, a photograph of an ammonite was color photographed and then color copied. Subsequently, the transfer liquid of the present invention was coated thereon 4 to 5 times and the coated photograph was immersed in water. Five minutes later, paper was removed (scrubbed away) from the substrate and the removal operation was easily carried out. A flexible and elongating transfer film was obtained without damaged images. Subsequently, this transfer film was retained unchanged or immersed in water if necessary. Thereafter, the film was adhered on the surface of the plaster casted ammonite (cast: male) while elongating the film so as to follow the shape of the surface configuration. Thus, transferred articles having the hue, patterns, and configuration of the surface of the ammonite thereon were provided. These articles turn out to be more closer to the actual things and, thus, can be effectively used as the educational materials in scientific education. When obtaining the above transfer film, inorganic powders can be dispersed on the surface after coating of the transfer liquid in order to create the texture of the fossil on the surface.

The polymer composition for film formation of the present invention is typically used in the transfer method as a transfer liquid, used as a material for forming a cracked film, and used as a decorating material. As described above, various utilization manners are possible.

The substrate supporting the object to be transferred may be any material so far as it can retain the object to be transferred on the coat (film) by removing (scrubbing etc.) through coating and drying of the polymer composition for film formation of the present invention followed by immersion in water and the like. In general, the substrate is, for example, paper, a felt, or a nonwoven fabric. Examples include: color photographs; drawings by pencils, crayons, Cray-Pus, inks, and pigment paints; paintings; design diagrams; draftings; and wiring diagrams. Color photographs are preferred from the viewpoint of realistic reproduction of the original, however, colored copies obtained from color photographs are recommended because of the good toner transferability.

The present invention will be described in more detail with reference to the following examples and comparative examples although it is not limited to these examples only.

EXAMPLE 1

A commercially available composition, which contains 92.5% by weight of a 55% nonvolatile polyvinyl acetate aqueous latex and 7.5% by weight of dibutyl phthalate, white birch sap, and water were mixed at a ratio of 5:1:1 by volume to prepare a polymer composition for film formation. A total water content was about 57% by weight. A film having good elongation was provided.

EXAMPLE 2

A commercially available composition, which contains 92.5% by weight of a 55% nonvolatile polyvinyl acetate aqueous latex and 7.5% by weight of dibutyl phthalate, sugar cane sap, and water were mixed at a ratio of 6:1:2 by volume to prepare a polymer composition for film formation. A total water content was about 66%.

EXAMPLE 3

A commercially available composition, which comprises 88.0% by weight of a 55% nonvolatile aqueous latex containing a copolymer constituted by vinyl acetate as a major component and acrylate as a minor component and 12.0% by weight of dibutyl phthalate, an aqueous solution of 3% by weight of sucrose, and water were mixed at a ratio of 6:1:2 by volume to prepare a polymer composition for film formation. A total water content was about 70%.

EXAMPLE 4

A commercially available composition, which comprises 88.0% by weight of a 55% nonvolatile aqueous latex containing a copolymer constituted by vinyl acetate as a major component and acrylate as a minor component and 12.0% by weight of dibutyl phthalate, honey, and water were mixed at a ratio of 7:1:3 by volume to prepare a polymer composition for film formation. A total water content was about 68%.

EXAMPLE 5

A commercially available composition, which comprises 92.5% by weight of a 55% nonvolatile aqueous latex containing a copolymer constituted by vinyl acetate as a major component and acrylate as a minor component and 7.5% by weight of dibutyl phthalate, fruit liquid, and water were mixed at a ratio of 5:1:2 by volume to prepare a polymer composition for film formation. A total water content was about 72%.

EXAMPLE 6

A commercially available composition, which comprises 92.5% by weight of a 55% nonvolatile aqueous latex containing a copolymer constituted by vinyl acetate as a major component and acrylate as a minor component and 7.5% by weight of dibutyl phthalate, white birch sap, and water were mixed at a ratio of 7:1:2 by volume to prepare a polymer composition for film formation. A total water content was about 64%.

COMPARATIVE EXAMPLE 1

A polymer composition for film formation was prepared from a commercially available composition, which contains 92.5% by weight of a 55% nonvolatile aqueous latex of polyvinyl acetate and 7.5% by weight of dibutyl phthalate. A total water content was about 50%.

COMPARATIVE EXAMPLE 2

A polymer composition for film formation was prepared from a commercially available composition, which comprises 88.0% by weight of a 55% nonvolatile aqueous latex containing a copolymer constituted by vinyl acetate as a major component and acrylate as a minor component and 12.0% by weight of dibutyl phthalate. A total water content was about 51%.

COMPARATIVE EXAMPLE 3

A polymer composition for film formation was prepared from a commercially available composition, which comprises 92.5% by weight of a 55% nonvolatile aqueous latex containing a copolymer constituted by vinyl acetate as a major component and acrylate as a minor component and 7.5% by weight of dibutyl phthalate. A total water content was about 48%. Characteristics of the polymer compositions for film formation, which were obtained in other Examples 1 to 6 and Comparative Examples 1 to 3 of the present invention, are shown in Table 1.

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Latex 1 | 50 | 60 | | | | | 100 | | |
| Latex 2 | | | 60 | 70 | | | | 100 | |
| Latex 3 | | | | | 50 | 70 | | | 100 |
| Sap 1 | 10 | | | | | 10 | | | |
| Sap 2 | | 10 | | | | | | | |
| Fruit liquid | | | | | 10 | | | | |

TABLE 1-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Honey |  |  |  | 10 |  |  |  |  |  |
| 3% sucrose solution |  |  | 10 |  |  |  |  |  |  |
| Water | 10 | 20 | 20 | 30 | 20 | 20 |  |  |  |
| Total water content, wt % | 57 | 66 | 70 | 68 | 72 | 64 | 50 | 51 | 48 |
| Ease of tansfer liquid to coat on paper | ◎ | ◎ | ○ | ◎ | ◎ | ◎ | X | X | X |
| Clarity of film upon immersion in water for a long period of time | Δ | Δ | ○ | ○ | ○ | ◎ | Δ | Δ | Δ |
| Removability of film and paper upon immersion in water for a short period of time | ○ | ○ | Δ | ○ | Δ | ◎ | ○ | ○ | ○ |
| Transferrability of image onto film | ○ | ◎ | ○ | ◎ | ○ | ◎ | ○ | ○ | ○ |
| Adhesiveness of film onto irregular curved surface | Δ | Δ | ○ | ○ | ○ | ◎ | Δ | Δ | Δ |
| Transferred image not being cracked even on complex irregular curved surface | X | Δ | X | Δ | Δ | ◎ | Δ | Δ | Δ |

Units are parts by weight: ◎: excellent, ○: good, Δ: somewhat poor, X: poor

EXAMPLE 7

A polymer emulsion equivalent to component (1) of the present invention was obtained from the market and mixed with component (2) of the present invention, thereby preparing the polymer composition for film formation of the present invention. The prepared polymer composition was coated on a substrate having a complex surface configuration and a film (coat) having the surface configuration transferred thereon was prepared. The film can cover the surface of an object having different configuration while being elongated after the removal from the substrate. The film, which once covered, was removed and immersed in water. The film, which regained its original surface configuration, was then obtained. It was confirmed by this series of operations that a film having an ability of shape-memory can be prepared from the polymer composition for film formation of the present invention.

EXAMPLE 8

A polymer emulsion equivalent to component (1) of the present invention was obtained from the market and mixed with component (2) of the present invention, thereby preparing the polymer composition for film formation of the present invention. The prepared polymer composition was coated on the substrate and another polymer composition for film formation constituted by a commercially available (1) was further coated thereon. As a result, when patterns, maps, draftings, wiring diagrams and the like were present on the surface of the substrate, a cracked film having traced cracks or geometric patterns was obtained. The film having powders conglomerated in cracks thereon could be obtained and a decorated article having a commercially available overcoat thereon could be also obtained.

EXAMPLE 9

A film was prepared on the substrate from a commercially available polymer emulsion equivalent to component (1) of the present invention or a polymer composition for film formation constituted by component (1) and component (2) of the present invention. Further, a commercially available other polymer emulsion equivalent to component (1) of the present invention was coated on the film and a gold foil was put thereon before the solidification of the film. Once cracks began to generate on the film, the gold foil was simultaneously cracked in compliance with the cracked pattern of the film. Thus, the cracked film having an enhanced decorating effect was prepared.

EXAMPLE 10

A polymer emulsion equivalent to component (1) of the present invention was obtained from the market and mixed with component (2) of the present invention, thereby preparing the polymer composition for film formation of the present invention. The prepared polymer composition was coated on the coated paper and dried and the paper was covered with a film. This was applied to a color printer (a toner type) and a clear image could be directly printed on the film surface. This print was immersed in water for about 5 minutes and the film was easily removed from the coated paper. This film has the equivalent properties as with the image transfer film of the present invention and could also cover the surface having a complex configuration.

EXAMPLE 11

The dried surface covered with a film on the coated paper prepared in Example 10 was pressed against the prints such as newspaper and then separated therefrom. Then, contents of the print were easily transferred onto the film surface. Further, this could be used as an image transfer film. When pressed against the prints, the transfer effect was enhanced through the optional heating.

INDUSTRIAL APPLICABILITY (i) The polymer composition for film formation according to the present invention can form a film (coat) by coating on a substrate, drying, and then removing. The film can be of an elongating durable type by rewetting with water and a film having a compatibility with a substrate with sharp irregularities can be provided.

(ii) The polymer composition for film formation according to the present invention can provide a transfer liquid (a transfer film obtained therefrom) capable of transferring a clear hue, patterns, and diagrams of an article to be transferred onto a film (coat) by coating onto a substrate supporting the object to be transferred, drying, and then removing.

(iii) The transfer film can be an elongating durable film by rewetting with water and a film having a compatibility with a substrate having sharp irregularities.

(iv) It can be effectively used particularly as an image transfer liquid onto a surface of the article having a complex configuration, which was impossible in conventional decoupage.

(v) The film and the image transfer film according to the present invention can intentionally or randomly generate cracks in a very rapidly and simple manner.

(vi) The transfer liquid of the present invention is easily coated and its drying time is short.

(vii) The transfer liquid of the present invention generates no bubble at the time of coating and can be warm-air dried. Thus, the next coating step can be rapidly performed.

(viii) When the transfer liquid of the present invention is used, it can proceed to the next step such as coating and application as long as it is immersed in water for about 5 minutes immediately after coating. At the same time, it does not generate cracks even when immersed for a long period of time and, thus, the time for preparing for the next step can be saved.

(ix) The film prepared from the transfer liquid of the present invention is of an elongatable type that can cope with complex irregularities. Even though the transfer substrate has complex irregularities, the entire substrate can be covered with a sheet of film without the necessity to prepare a film that is cut into pieces so as to follow the shape of irregularities unlike conventional techniques. Thus, the operability is excellent.

(x) The film prepared from a conventional transfer liquid is less likely to be reduced to the original size if excessively elongated. The film prepared from the transfer liquid of the present invention can be reduced to the original size through removal followed by immersion in water before adhesion even if excessively elongated at the time of application.

(xi) The film prepared from the conventional transfer liquid is hardened and is likely to be cracked. Thus, it is not adequate to the dry storage. The film prepared from the transfer liquid of the present invention can be stored for a long period of time by, for example, sandwiching between coated papers and the like since it is soft even in a completely dried state.

(xii) A conventional method for forming a cracked film required steps of coating a coating liquid (transfer liquid) 5 to 6 times, coating a cracking agent to about 2 mm-thick, leaving for 2 to 3 days, wetting the surface, and then removing the cracking agent with water-resistant paper and the like. According to the method according to the present invention, upon coating of a coating liquid (transfer liquid) followed by another liquid, the coat is dried in about 20 minutes and a cracked film can be provided. Thus, procedures are simple and the time can be shortened.

(xiii) According to the transfer method utilizing the transfer liquid of the present invention, even if an object to be transferred is on the surface of a three-dimensional object or is a photograph of a surface of a three-dimensional object, a film can be elongated in accordance with the configuration of a three-dimensional object at the time of transference. Thus, the method is particularly advantageous in the transference of the three-dimensional object (image).

(xiv) Regarding the substrate, which is covered with a film prepared by applying the transfer liquid of the present invention onto a surface of a substrate such as paper, plastics, metals, glasses, ceramics, or fabrics, followed by drying, printing can be directly provided on the film surface and images can be transferred by pressing the print against the film surface. Further, these printed films removed from the substrate can cover the surface of the other object. Thus, it is particularly advantageous in industrial application.

What is claimed is:

1. A polymer composition for film formation consisting essentially of:
    (1) a polymer component comprising either (i) a homopolymer of vinyl acetate or a partial hydrolyzate thereof or (ii) a copolymer of vinyl acetate with at least one monomer selected from an acrylic ester, acrylic amide, acrylic acid, methacrylic acid, methacrylic ester, maleic acid, maleic anhydride, and fumaric acid or a partial hydrolyzate thereof; and
    (2) a component comprising at least one member selected from:
        (a) sap,
        (b) fruit liquid,
        (c) honey, and
        (d) saccharide.

2. The polymer composition for film formation according to claim 1 wherein component (2) comprise sap obtained from at least one member selected from pine, white birch, maple, sugar cane, and sugar beet.

3. The polymer composition for film formation according to claim 1 wherein component (2) comprises fruit liquid obtained from at least one member selected from grapes, peaches, citrus fruits, apples, bananas, watermelons, melons, cherries, pears, pineapples, palms, papayas, mangos, and durians.

4. The polymer composition for film formation according to claim 1 wherein component (2) comprises honey obtained from at least one member selected from milk vetches, horse chestnuts, and acacias.

5. The polymer composition for film formation according to claim 1 wherein component (2) comprises a saccharide selected from xylitol, sucrose, fructose, glucose, chitosan, chitin, mannan, and guar gum.

6. The polymer composition for film formation according to claim 1 wherein component (1) is in an emulsion form.

7. The polymer composition for film formation according to claim 6 wherein component (1) comprises 100 parts by volume of an emulsion and component (2) comprises 5 to 50 parts by volume of an aqueous solution.

8. The polymer composition for film formation according to claim 1 wherein the polymer composition is in an emulsion form.

9. The polymer composition for film formation according to claim 1 which further comprises at least one member selected from a plasticizer, a storage stabilizer, a filler, a dyestuff, a pigment, a flavor, a light-resisting agent, and an oxidation stabilizer.

10. The polymer composition for film formation according to claim 9 wherein the component (1) comprises 3 to 30% by weight of a plasticizer.

11. The polymer composition for film formation according to claim 1 wherein said composition has a total water content of 55 to 95% by weight.

12. A polymer composition for decoupage coating prepared from the polymer composition for film formation according to claim 1.

13. A transfer liquid prepared from the polymer composition for film formation according to claim 1.

14. A printing film having a transferability and prints prepared therewith, which is obtained through the application of the transfer liquid according to claim 13 onto a surface of a substrate followed by drying.

15. A printing film according to claim 14 wherein the substrate is selected from at least one of paper, plastics, fabrics, metals, glasses, and ceramics.

16. An article having the printing film and the prints prepared therewith according to claim 14.

17. A transfer film comprising a film prepared from a transfer liquid and an object transferred onto the film, which is prepared by applying the transfer liquid according to claim 13 onto the object to be transferred and semi-drying the liquid to form a film.

18. The transfer film according to claim 17, which has cracks, irregularities, or a combination thereof.

19. A transfer method wherein a transfer film according to claim 17 is applied onto a transfer substrate and integrated with the substrate.

20. A transferred product comprising an object to be transferred and a transfer substrate which is produced by the transfer method according to claim 19.

21. The transfer method according to claim 19, wherein the polymer composition is applied to the transfer film before application onto the transfer substrate.

22. The transfer method according to claim 21 wherein the object to be transferred is selected from hues, patterns, symbols, figures, letters, maps, draftings, wiring diagrams, three-dimensional configurations thereof, and a combination of two or more thereof, whereby cracks are generated along the lines constituting the covered object to be transferred.

23. The transfer method according to claim 19, wherein the polymer composition is applied to the transfer film after application onto the transfer substrate.

24. The transfer method according to claim 23 wherein the object to be transferred is selected from hues, patterns, symbols, figures, letters, maps, draftings, wiring diagrams, three-dimensional configurations thereof, and a combination of two or more thereof, whereby cracks are generated along the lines constituting the covered object to be transferred.

25. A transfer method wherein, in the application of a transfer film according to claim 17 onto a transfer substrate, an adhesive is interposed between the transfer substrate and the transfer film, thereby transferring an object to be transferred onto the substrate.

26. A transferred product comprising an object to be transferred and a transfer substrate which is produced by the transfer method according to claim 25.

27. The transfer method according to claim 25, wherein the polymer composition applied to the transfer film before application onto the transfer substrate.

28. The transfer method according to claim 27 wherein the object to be transferred is selected from hues, patterns, symbols, figures, letters, maps, draftings, wiring, three-dimensional configurations thereof, and a combination of two or more thereof, whereby cracks are generated along the lines constituting the covered object to be transferred.

29. The transfer method according to claim 25, wherein the polymer composition is applied to the transfer film after application onto the transfer substrate.

30. The transfer method according to claim 29 wherein the object to be transferred is selected from hues, patterns, symbols, figures, letters, maps, draftings, wiring, three-dimensional configurations thereof, and a combination of two or more thereof, whereby cracks are generated along the lines constituting the covered object to be transferred.

31. The transfer film according to claim 17, wherein the object to be transferred is selected from hues, patterns, symbols, figures, letters, maps, draftings, wiring diagrams of a surface of a substrate for supporting the object to be transferred, three-dimensional configurations thereof, and a combination of two or more thereof.

32. The transfer film according to claim 17, which has an ability of shape-memory.

33. The transfer film according to claim 32, wherein a substrate for supporting an object to be transferred has a three-dimensional or plane configuration and the resultant transfer film maintains said three-dimensional or plane configuration.

34. A method for forming a cracked film by applying the polymer composition for film formation according to claim 1 onto a surface of a substrate supporting an object to be transferred to form a film and covering the surface of the film with a substance different from a component of the film, whereby cracks are generated integrally to the substrate and the film.

35. The method according to claim 34, wherein a substance different from a component for coating is added in a cracked portion.

36. The method of claim 35 wherein at least one powder or liquid selected from a metal, a dyestuff, and a pigment, and another organic or inorganic substance is added into various cracked portions.

37. An article containing a film produced by the method of claim 36.

38. The method according to claim 34 wherein the object to be transferred is selected from hues, patterns, symbols, figures, letters, maps, draftings, wiring diagrams, three-dimensional configurations thereof, and a combination of two or more thereof, whereby cracks are generated along the lines constituting the covered object to be transferred.

39. An article which has a cracked film prepared by integrating the film produced by a method according to claim 38.

40. A cracked film which is obtained by removing the film produced by a method according to claim 34 from a supporting substrate.

41. An article which has cracked film prepared by integrating the film produced by a method according to claim 34.

42. A kit for cracked film formation comprising the polymer composition for film formation according to claim 1 and a treating liquid for crack formation.

43. A polymer composition for film formation consisting essentially of:
(1) a polymer component comprising either (i) a homopolymer of vinyl acetate or a partial hydrolyzate thereof, or (ii) a copolymer of vinyl acetate with at least one monomer selected from an acrylic ester, acrylic amide, acrylic acid, methacrylic ester, maleic acid, maleic anhydride, and fumaric acid or a partial hydrolyzate thereof; and
(2) a component comprising at least one member selected from:
(a) sap obtained from at least one member selected from pine, white birch, maple, sugar cane, and sugar beet;
(b) fruit liquid obtained from at least one member selected from grapes, peaches, citrus fruits, apples, bananas, watermelons, melons, cherries, pears, pineapples, palms, papayas, mangos, and durians;
(c) honey obtained from at least one member selected from milk vetches, horse chestnuts, and acacias; and
(d) saccharide selected from at least one member of xylitol, sucrose, fructose, glucose chitosan, chitin, mannan, and guar gum.

44. The polymer composition for film formation according to claim 43 wherein component (1) is in an emulsion form.

45. The polymer composition for film formation according to claim 43 wherein the polymer composition is in an emulsion form.

46. The polymer composition for film formation according to claim 43 which further comprises at least one member selected from a plasticizer, a storage stabilizer, a filler, a dyestuff, a pigment, a flavor, a light-resisting agent, and an oxidation stabilizer.

47. The polymer composition for film formation according to claim 43 wherein the component (1) comprises 3 to 30% by weight of a plasticizer.

48. The polymer composition for film formation according to claim 43 wherein component (1) comprises 100 parts by volume of an emulsion and component (2) comprises 5 to 50 parts by volume of an aqueous solution.

49. The polymer composition for film formation according to claim 43 wherein said composition has a total water content of 55 to 95% by weight.

50. A polymer composition for decoupage coating prepared from the polymer composition for film formation according to claim 43.

51. A transfer liquid prepared from the polymer composition for film formation according to claim 43.

52. A transfer film comprising a film prepared from a transfer liquid and an object transferred onto the film, which is prepared by applying the transfer liquid according to claim 51 onto the object to be transferred and semi-drying the liquid to form a film.

53. The transfer film according to claim 52, wherein the object to be transferred is selected from hues, patterns, symbols, figures, letters, maps, draftings, wiring diagrams of a surface of a substrate for supporting the object to be transferred, three-dimensional configurations thereof, and a combination of two or more thereof.

* * * * *

UNITED STATES PATENT AND TRADEMARK OFFICE
CERTIFICATE OF CORRECTION

PATENT NO. : 6,953,816 B2 Page 1 of 1
APPLICATION NO. : 10/111312
DATED : October 11, 2005
INVENTOR(S) : Chizuko Okazaki and Naoki Mita It is certified that error appears in the above-identified patent and that said Letters Patent is hereby corrected as shown below:

On the title page item (75), "Inventor: Chizuko OKAZAKI, Hokkaido (JP)" should read --Inventors: Chizuko OKAZAKI, Hokkaido (JP)
Naoki MITA, Ibaraki (JP)--

Signed and Sealed this

Twenty-ninth Day of July, 2008

JON W. DUDAS
*Director of the United States Patent and Trademark Office*